US009030329B2

(12) United States Patent
Rutherford et al.

(10) Patent No.: US 9,030,329 B2
(45) Date of Patent: May 12, 2015

(54) SMART METHANE MONITOR (75) Inventors: James Rutherford, Cypress, TX (US); Paul Wehnert, Kemah, TX (US); Steve Chancey, Houston, TX (US)

(73) Assignee: Heath Consultants, Inc., Houston, TX (US)

(*) Notice: Subject to any disclaimer, the term of this patent is extended or adjusted under 35 U.S.C. 154(b) by 550 days.

(21) Appl. No.: 12/758,627

(22) Filed: Apr. 12, 2010

(65) Prior Publication Data
US 2011/0248857 A1   Oct. 13, 2011

(51) Int. Cl.
| G08B 17/10 | (2006.01) |
| G08B 23/00 | (2006.01) |
| G08C 15/06 | (2006.01) |
| G08C 19/20 | (2006.01) |
| G08B 25/10 | (2006.01) |
| G08B 21/16 | (2006.01) |

(52) U.S. Cl.
CPC .............. *G08B 25/10* (2013.01); *G08B 21/16* (2013.01)

(58) Field of Classification Search
USPC .............................. 340/626, 630, 632; 348/70
See application file for complete search history.

(56) References Cited

U.S. PATENT DOCUMENTS

| 4,996,431 A * | 2/1991 | Bonne et al. .................. 250/343 |
| 5,381,136 A * | 1/1995 | Powers et al. ............ 340/539.26 |
| 6,025,788 A * | 2/2000 | Diduck .................... 340/870.16 |
| 6,670,887 B2 * | 12/2003 | Dungan ........................ 340/632 |
| 7,034,704 B2 * | 4/2006 | Mahowald .................... 340/632 |
| 7,088,239 B2 * | 8/2006 | Basinger et al. ......... 340/539.17 |
| 7,275,411 B2 * | 10/2007 | Peng .............................. 73/1.06 |
| 7,326,931 B2 * | 2/2008 | Frodl et al. .................... 250/343 |
| 7,351,954 B2 * | 4/2008 | Zhang et al. ............... 250/252.1 |
| 2006/0267756 A1 * | 11/2006 | Kates ............................ 340/521 |
| 2007/0143456 A1 * | 6/2007 | Mashinsky .................... 709/223 |
| 2007/0222636 A1 * | 9/2007 | Iwamura ................. 340/870.01 |
| 2008/0117066 A1 * | 5/2008 | Kononov et al. ............. 340/632 |

OTHER PUBLICATIONS

Reynolds Equipment, Co. "Recor 325 RVC Electronic Volume Corrector, Specifications." Apr. 2009. Houston, TX. <http://www.reynoldsequipmentcom>.
Rae Systems, Inc. "Theory and Operation of NDIR Sensors." Technical Note TN-169, Apr. 2002. San Jose, CA. <http:www.raesystems.com>.
Renolds Equipment, Co. "Recor 325 CDR User's Manual & Field Installation Guide." 2009, Houston, TX. <http://www.reynoldsequipment.com>.

(Continued)

*Primary Examiner* — Daniell L Negron
*Assistant Examiner* — Mohamed Barakat
(74) *Attorney, Agent, or Firm* — Gary L. Bush; Andrews Kurth LLP (57) ABSTRACT

A method and apparatus for the detection of methane gas including a low-cost low-power infrared methane sensor integrated with a smart energy network endpoint node, a volume corrector, or an electronic data recorder for transmission of alarm conditions and detector data between the instrument and a remote gas utility company. An independent gas calibration/verification cell may be included in the methane detector for periodically testing the functioning and calibration of the infrared sensor. An infrared carbon monoxide sensor and associated calibration/verification cell may also be installed with the methane sensor.

5 Claims, 6 Drawing Sheets

(56) References Cited

OTHER PUBLICATIONS

Reynolds Equipment, Co. "Recor 325 Series User's Manual & Field Installation Guide." 2009, Houston, TX. <http://www.reynoldsequipment.com>.

"ZigBee Smart Energy Features." ZigBee Alliance, n.d. Web. Dec. 22, 2009. <http://www.zigbee.org/Markets>.

Gohn, Bob. "Zigbee-based demand-response systems reduce home energy usage." Digital Home DesignLine, Nov. 25, 2008. Web. Dec. 23, 2009. <http://digitalhomedesignline.com>.

"Wall Mount Multipurpose Gas Detector/Alarm." Kernco Instruments Co.. N.p., n.d. Web. Dec. 28, 2009. <http://www.kerncoinstr.com/51a60.htrn>.

"All About NDIR Gas Sensors." www.squidoo,com/ndirsensor, Dec. 30, 2009 (date accessed).

\* cited by examiner

SMART METHANE MONITOR

BACKGROUND OF THE INVENTION

1. Field of the Invention

This invention relates generally to remote monitoring systems, and in particular to remote methane monitoring systems for the purpose of detecting the presence of natural gas leaks within residential, commercial, and industrial facilities.

2. Background Art

Natural gas utility companies operate approximately 61 million customer gas meters in the United States alone, supplied by over one million miles of pipeline, 17 hundred transmission stations and 17 thousand compressors. To help maintain security and integrity of this vast distribution system, the natural gas utility industry installs volume correctors and electronic data recorders at compressor stations, metering stations, step-down stations and meter vaults, for example, which provide trend data about the functionality of the distribution system. A volume corrector is typically installed with a gas meter. The volume corrector accurately measures the pressure and temperature of the gas and corrects the volume flow estimation from the gas meter using ideal gas law calculations. Similarly, an electronic data recorder accurately measures pressure and temperature and stores the information. Both types of instruments communicate the stored results to the utility company using proprietary supervisory control and data acquisition (SCADA) systems modulated over plain old telephone service (POTS).

Gas pipelines are also subject to regular inspections to detect leaks. Routine periodic leak surveys are costly, and it is estimated that the natural gas distribution and transmission industry spends over $300 million annually to survey the pipeline network for leaks. Moreover, because gas leaks may occur at appliances or within interior distribution piping on the consumer side of the gas meter, utility pipeline surveys are of limited effect.

Gas explosions due to leakage and accumulation of natural gas in end-user buildings are an unfortunate and too frequent occurrence. Currently, like smoke detectors, heat detectors, carbon monoxide detectors and water sensors, there exists several types of discrete natural gas sensors that may be installed in homes or commercial buildings that notify occupants when there is a predetermine minimum concentration natural gas in the atmosphere. Such natural gas detectors are typically stand-alone alarms that sound a warning when triggered so that the occupants may safely evacuate. However, some models include relay contacts so that they can be wired into a central alarm or home security system. A security monitoring service may then notify authorities in the event an alarm is triggered.

Natural gas detectors may rely on varying detection methods and principles. For example, combustible gas indicators (CGIs) work on the principles of catalytic combustion and thermal conductivity of a gas sample and thus sense virtually all combustible gases. CGIs are low-sensitivity devices that are generally unable to detect gas mixtures much below the lower combustible concentration limit. A more sensitive leak detector commonly used is the flame ionization detector (FID). The FID operates on the principle of measuring the ionic concentration produced in a flame burning carbon compounds. Like the CGIs, FIDs sense hydrocarbon gases. While the CGI typically measures gas concentration in percentage, the FID typically measures gas concentration in parts per million (ppm). The CGI and FID both typically use an extractive sample or measurement path. In this method, target gas concentration is measured by a detector installed in a measurement chamber through which gases of interest are continually drawn from the immediate surrounding atmosphere.

The optical methane detector (OMD™) operates by absorption of infrared (IR) light by methane. Because natural gas primarily contains methane gas, detection of methane gas serves for detection of natural gas. It is a well known spectroscopic principle that gas molecules absorb energy in narrow bands (sometimes referred to as absorption lines) surrounding specific wavelengths in the electromagnetic spectrum. For example, methane has strong absorption bands at 1.33 µm, 1.66 µm, 3.3 µm, and 7.6 µm. At wavelengths falling even slightly outside the narrow absorption band, there is essentially no absorption. Thus, an OMD measures the attenuation of an infrared light source passing through a gas sample at the methane-characteristic absorption wavelength to determine the presence of methane gas. An OMD is more selective than either a CGI or a FID, because it measures methane specifically and not all combustible gases. OMDs generally use a short open path sample method, which eliminates the sampling time delay associated with extractive sampling method of CGIs or FIDs. In a short open path configuration, the light source is transmitted across a line of sight and is either reflected to an optical detector by a fixed reflector of known characteristics located only a short distance from the light source or the light is received directly by a fixed detector located only a short distance away from the light source. OMD sensitivity in detecting methane is of the same order of magnitude as a FID.

A laser methane detector is a prior-art device that operates on the same absorption spectroscopy principle as an OMD but uses a rapidly and specifically-tunable wavelength-modulated diode laser as a light source. By sweeping the laser wavelength between a non-absorption band and a particular absorption band of a target gas molecule and monitoring the reflection measurements during the wavelength sweeps, both the background transmittance over the laser beam's path and the concentration of target gas molecules integrated within the laser beam's path can be accurately determined. A laser methane detector is thus well-suited for utility company pipeline surveys, because a fixed sample chamber is not required and accurate measurements can be made over long and widely-varying path lengths.

However, CGIs, FIDs, OMDs, and laser detectors are generally considered to be too expensive to be widely accepted for home use and thus find limited use, typically in potentially hazardous industrial locations. Current sensors widely used in home natural gas detectors are based on electrochemical catalytic semiconductors, whose electrical properties are altered in the presence of various hydrocarbon gases. These sensors are inexpensive, but they have significant performance limitations. Electrochemical catalytic semiconductors are unstable, prone to drift, and subject to false alarms due to moisture or household chemicals. The sensors, which are easily contaminated by household chemicals, have a relatively short life span. Additionally, there is no practical way for the home owner to test the calibration and functioning of the detector. As a result, the homeowner is at risk that the methane sensor may frequently trigger false alarms or may not alarm at all when a detectable hazardous condition is present.

Although state and federal safety commissions are increasingly urging the use of natural gas monitors, there is currently little utility company monitoring of detectable atmospheric gas levels at the end-user locations. Low cost electrochemical semiconductor methane sensors are too prone to false alarms, and more reliable detectors have been too expensive to deploy. Perhaps a more significant barrier has been the lack of a low cost reliable infrastructure through which a multitude of methane detectors can communicate back to the utility company.

If reliable methane monitors are widely deployed at a gas utility company's end-user locations and each monitor automatically notifies the gas utility company of actual pending dangers, proactive steps may be taken by the utility company to alleviate the danger before a catastrophe occurs.

3. Identification of Objects of the Invention

Therefore, a primary object of the invention is to provide a cost-effective system and method for utility-provider-monitoring of actual atmospheric gas levels at various distribution system and end-user locations, including residential, commercial and industrial buildings.

Another object of the invention is to provide a methane detector that uses Smart Energy™ communication networks for compatibility, rapid deployment, and low cost.

Another object of the invention is to provide a method and apparatus for monitoring natural gas levels that provides the ability to monitor the gas level at a remote installation.

Another object of the invention is to provide a method and sensor for monitoring natural gas levels in which the functioning of the sensor can be automatically or remotely tested and calibrated, and if not working properly, notification can automatically be provided to the end-user and to the gas company.

Another object of the invention is to provide a method and sensor for monitoring natural gas levels in which the results of sensor self-tests are further analyzed to project the need for service.

Another object of the invention is to provide a method and sensor for monitoring the atmosphere in remote locations in which carbon monoxide gas and natural gas levels may be present.

Another object of the invention is to provide a volume corrector with integrated methane detector that communicates with a gas utility company.

Another object of the invention is to provide an electronic data recorder with integrated methane detector that communicates with a gas utility company.

Another object of the invention is to provide a fire alarm with integrated methane detector that communicates with a gas utility company.

SUMMARY OF THE INVENTION

The objects described above and other advantages and features of the invention are incorporated in a first embodiment in a method and system for the detection of methane gas including a low-cost low-power infrared methane sensor integrated with a smart energy network endpoint node for data transmission between the instrument and a remote gas utility company.

In a second embodiment of the invention, a low-cost low-power infrared methane sensor is integrated with a volume corrector or an electronic data recorder.

An independent gas calibration cell may be included in the methane detector for periodically testing the functionality and calibration of the infrared sensor. An infrared carbon monoxide sensor may also be installed with the methane sensor.

BRIEF DESCRIPTION OF THE DRAWINGS

The invention is described in detail hereinafter on the basis of the embodiments represented in the accompanying figures, in which.

DESCRIPTION OF THE PREFERRED EMBODIMENT OF THE INVENTION

Figure 1:
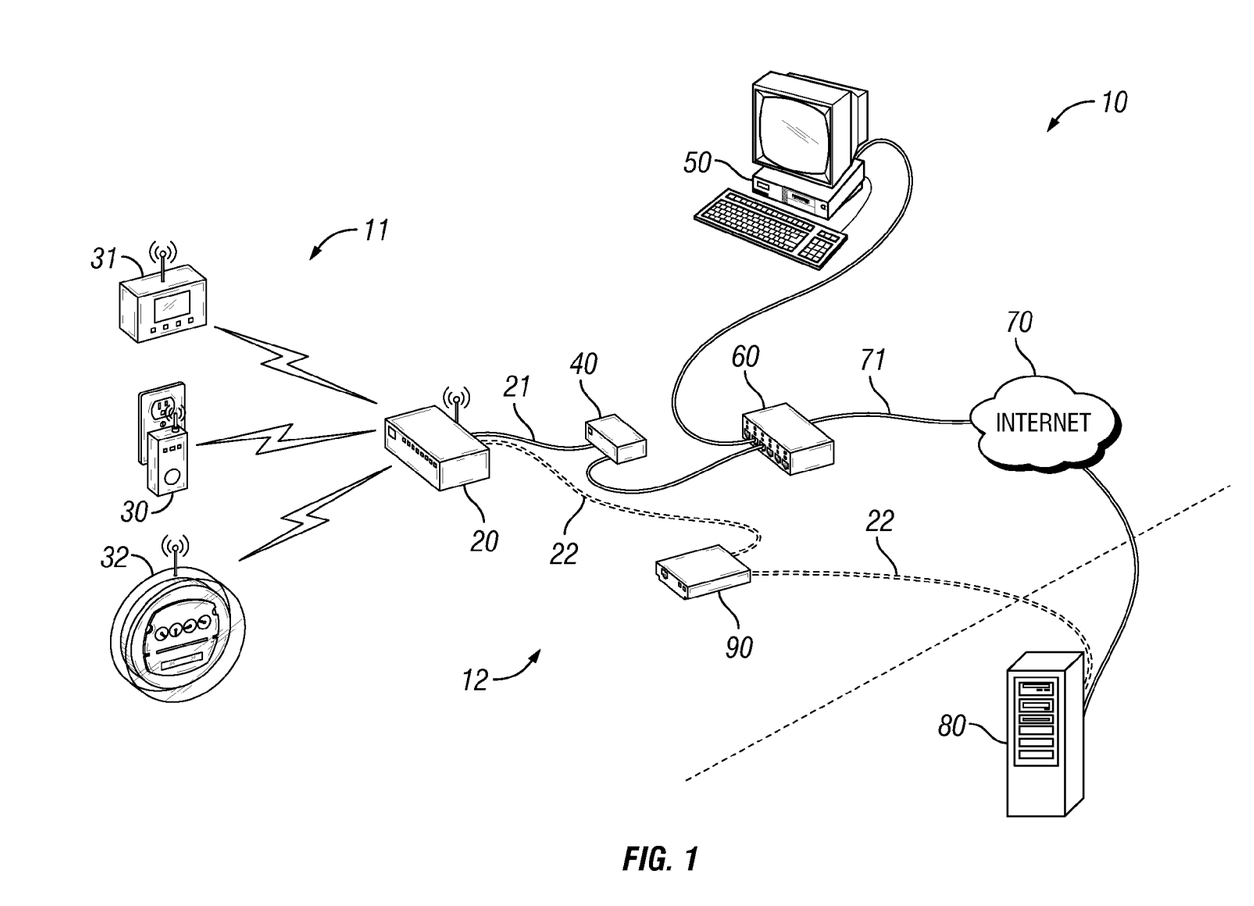
FIG. 1 is a functional schematic diagram of a smart methane monitoring system according to a first embodiment of the invention that is integrated with a wireless smart energy network, which is in turn linked to a hardwired local area network for communicating with a gas utility company via the internet.
Figure 2:
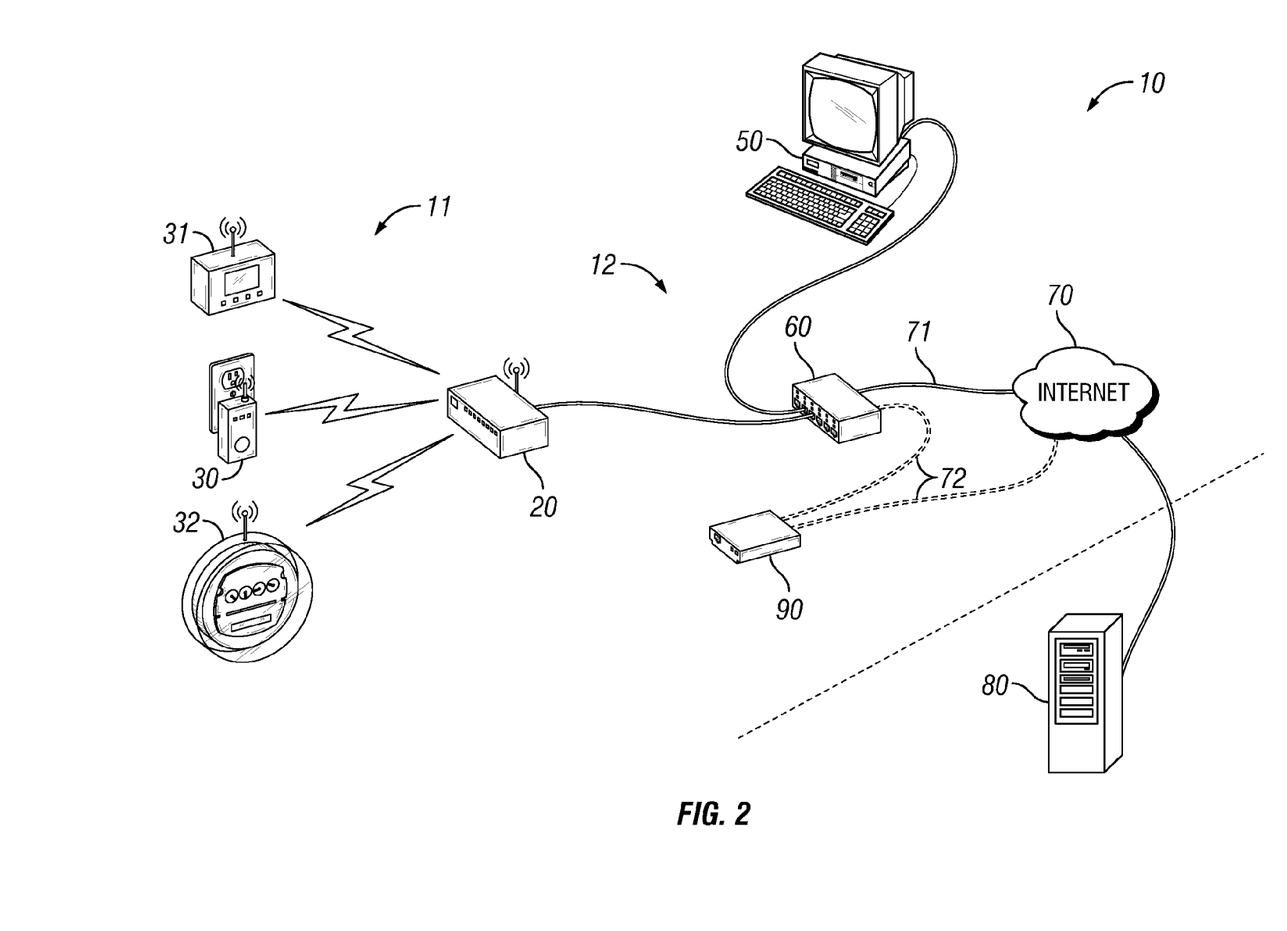
FIG. 2 is a functional schematic diagram of the smart methane monitoring system of FIG. 1 showing an alternate interface linking the wireless smart energy network to the hardwired local area network.
Figure 3:
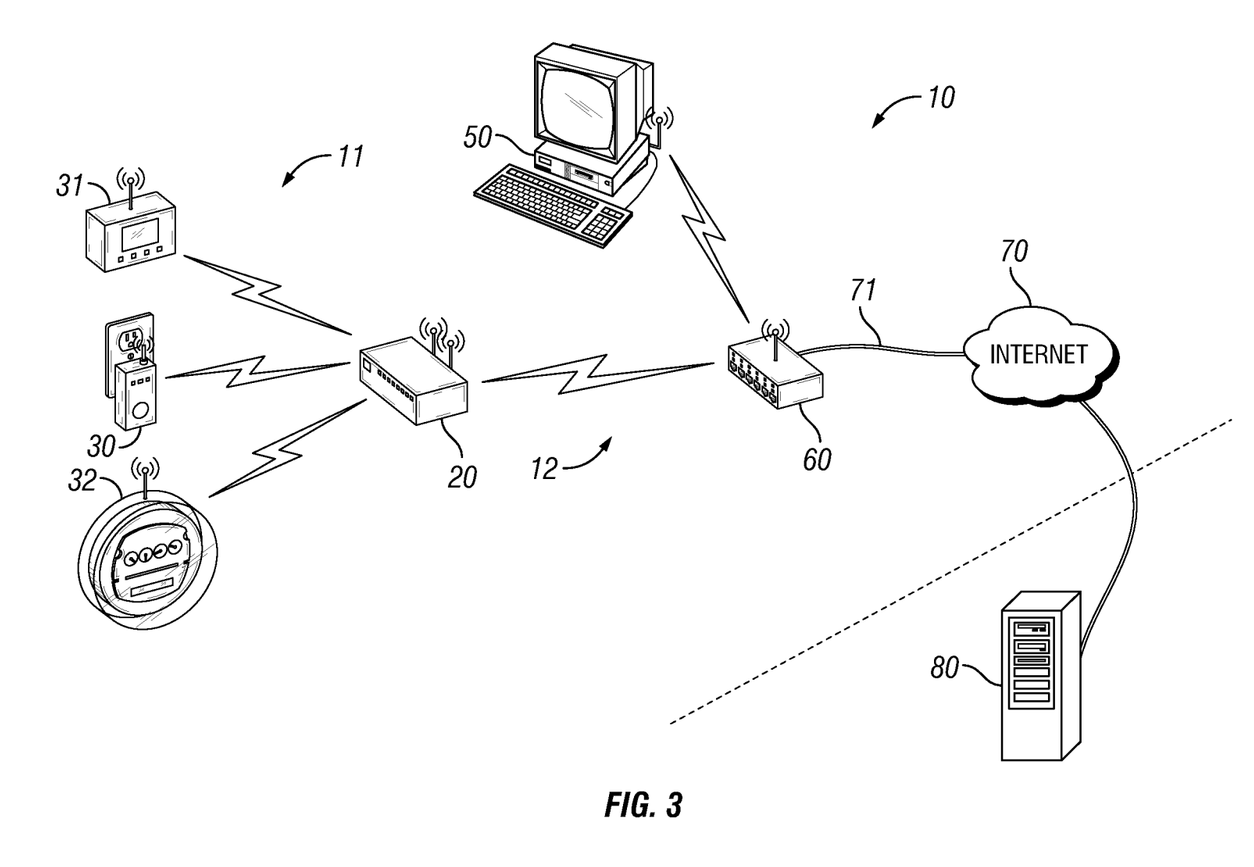
FIG. 3 is a functional schematic diagram of a smart methane monitoring system according to a second embodiment of the invention that is integrated with a wireless smart energy network linked to a wireless local area network for communicating with a gas utility company via the internet.

FIGS. 1-3 illustrate exemplar "Smart Energy™" or "Smart Grid" networks 10 according to a preferred embodiment of the invention. "Smart Energy" is a relatively new and rapidly developing technology being embraced by a number of utility companies. Smart energy offers utility companies secure, easy-to-use wireless home area networks (HAN) for implementing energy management programs under anticipated government mandates to control or ration the distribution of energy. Smart energy allows utilities to directly communicate with smart meters, thermostats, load control devices, and other smart appliances of end users. Advanced metering is available for multiple energy commodities including electricity, natural gas and water. Advanced metering, which allows multiple measurement types such load profile, power factor, summation, demand and tiers, can provide real-time consumption information to both the consumer and the utility. Demand response and load control is a smart energy technique for scheduling disconnection, reconnection and/or adjustment of multiple specific groups of devices including furnaces, heat pumps, air conditioning units, water heaters, and lighting. For example, during peak demand periods utilities can automatically adjust set points on programmable communicating thermostats or can turn off large appliances such as air conditioning units, swimming pool pumps, ovens, ranges, and resistance heaters.

Smart energy network 10 includes a wireless network 11 over which various locally distributed smart-energy-compliant sensors and devices communicate. Wireless network 11 ideally complies with IEEE 802.15.4 wireless and ZigBee™ communication protocol specifications using the Smart Energy™ profile.

IEEE 802.15.4 wireless specification calls for operation in the unlicensed industrial, scientific and medical (ISM) radio bands—915 MHz in the USA and Australia, 868 MHz in Europe, and 2.4 GHz in most other locations worldwide. Binary phase shift keying (BPSK) modulation is used in the 915 and 868 MHz bands, and orthogonal quadrature phase shift keying (QPSK) is used in the 2.4 GHz band to achieve an uncorrected data rate of 40 kbit/s per channel in the 915 MHz band, 20 kbit/s in the 868 MHz band, and 250 kbit/s per channel in the 2.4 GHz band, respectively. Transmission range extends up to between 125 and 250 feet.

ZigBee is a specification for a suite of high level communication protocols for use with small, low-power digital radios to form wireless personal area networks (WPANs) or home area networks (HANs). ZigBee is suitable for low-power low-bandwidth applications. Because ZigBee is an open standard, it supports a competitive marketplace of multiple vendors, which lowers cost. ZigBee certified devices ensure interoperability, and its robust ability for automatic network registration, using either pre-installed cryptographic keys or standard public keys, provides a flexible secure network that is simple to use. In addition to home and industrial automation and control, ZigBee is widely used for smart energy technology.

ZigBee radio transceiver chips are commercially available with integrated microcontrollers, typically up to 256 kBytes of flash memory, and a prepackaged ZigBee software stack. The ZigBee protocol enables a general-purpose, self-organizing ad hoc mesh network of nodes that communicate using a "carrier sense, multiple access/collision avoidance" scheme. Simply put, the nodes communicate within the network in the same manner that polite people converse—before transmitting, each node briefly "listens" to the network to ensure no other node is actively transmitting.

The base of wireless network 11 is a ZigBee network coordinator 20. Coordinator 20 creates and manages wireless network 11, storing information about each node in the network including security keys. FIG. 1 shows three ZigBee end devices 30, 31, 32 forming the other nodes of wireless network 11, although a greater or lesser number of devices may actually be present in any particular network 11. A ZigBee end device need contain just enough functionality to communicate with coordinator 20 and need not relay data from other end devices. This simplicity reduces production costs and allows an end device 30, 31, 32 to remain in a low-power dormant mode a significant amount of time, thus enhancing battery life.

ZigBee end device 30 is a methane detector that is integrated with ZigBee interface electronics and implements the Smart Energy™ profile. Methane detector 30 is powered from a standard household power outlet and has a battery backup, although other power configurations may be used. Methane detector 30 is preferably able to detect a level of methane of about 500 ppm, notify the building occupants of an alarm condition and concurrently notify the gas utility company via the smart energy network 10. In a preferred embodiment, methane detector 30 uses an infrared sensor that operates on well-known spectroscopy principles. By using IR sensors, high selectivity, stability, long-life and low false-alarm-rate methane detectors 30 are obtained. More preferably still, methane detector 30 uses non-dispersive infrared (NDIR) sensors, although laser-based, opto-acoustic, LED, or fiber optic sensors may also be used as appropriate.

A NDIR methane sensor includes an IR source, a transparent sample chamber, an optical filter, and an IR detector. All wavelengths produced by the IR source are directed through the sample chamber toward the IR detector. The optical filter, which eliminates all light except for one or more of the characteristic absorption wavelengths of methane gas and/or carbon monoxide, is placed directly in front of the IR detector. Recent advancements in IR detectors and sources have enabled the development of lower cost NDIR sensors. As IR sensors are understood by routineers in the art, the topic is not discussed further herein.

In a preferred embodiment, a independent calibration gas cell is included in detector 30 and is used to test the functionality, calibration and alarm verification of the infrared sensor. A hermetically sealed glass vile is temporarily placed within the light path of the sensor. This calibration cell contains a known concentration of methane gas and/or carbon monoxide. Calibration readings are periodically taken. For example, detector 30 automatically performs routine self-tests. Detector 30 may also be remotely commanded via network 10 to perform a self-test. The results of the calibration/verification checks are compared to internally stored presets. If detector 30 is not working properly, notification is provided to the homeowner and/or to the gas utility company. Self-test results may also be transmitted to the gas utility company for further analysis to project the need for detector service. In another embodiment using a laser based IR sensor, a self test and calibration may also include measurement and adjustment of a laser's wave length.

An optional infrared-based carbon monoxide sensor may also installed with the methane detector 30 for detection of both carbon monoxide and natural gas. In this configuration, a dedicated carbon monoxide calibration/verification cell may be included, or a single calibration/verification cell that includes known concentrations of both carbon monoxide gas and methane may be used.

ZigBee end device 31 is a display unit that is integrated with ZigBee interface electronics. Display 31 is programmed to display the methane gas concentration detected by methane detector 30. Display 31 may indicate gas concentration in ppm or percent of lower explosive limit, for example.

ZigBee end device 32 is shown as a generic utility meter, such as an electricity, gas or water meter, which forms no part of the present invention but is illustrated as being a node in a typical smart energy network 10.

Coordinator 20 bridges the ZigBee wireless network 11 with a standard computer network 12, which is typically a IEEE 802.3 hardwired Ethernet local area network (LAN) as shown in FIGS. 1 and 2 or a wireless IEEE 802.11 WiFi wireless local area network (WLAN) as shown in FIG. 3.

In FIG. 1, coordinator 20 employs a Texas Instruments® CC2530 or equivalent ZigBee radio chip. The TI CC2530 offers dual universal synchronous/asynchronous receiver/transmitter (USART) interfaces. For this reason, coordinator 20 of FIG. 1 employs a serial computer interface 21, such as a RS-232, RS-422, RS-485, IrDA, or USB interface. An Ethernet-to-serial converter 40, such as one commercially available from Lantronix® or NetBurner,® links coordinator 20 to LAN 12. In FIG. 2, coordinator 20 includes onboard circuitry to provide an Ethernet interface, such as a 10-Base-T interface, and is thus connected directly to LAN 12. In FIG. 3, coordinator 20 includes onboard circuitry to provide WiFi connectivity for bridging to WLAN 12.

Computer network 12 may include an optional computer 50. Computer 50 includes a webpage portal or similar software by which an operator or a homeowner, for example, may view the status of smart energy network 10, including the real-time status of smart methane monitor 30. The webpage portal may include password protection.

Computer network 12 includes an internet gateway 60 such as a cable or digital subscriber line (DSL) modem. Internet gateway preferably includes router functionality for multiple network connections. As computer and internet networking are well known in the art, the topic is not discussed in further detail herein.

Although FIGS. 1-3 each illustrate only one local smart energy network 10, a large number of individual local smart energy networks 10 are contemplated—ideally one for each building served by a gas utility company. The gas utility company provides one or more server computer systems 80 that are connected to the internet 70 for monitoring the large number of customer smart energy networks 10. When a smart methane detector 30 in one of the smart energy networks 10 generates a high-methane-level alarm, the detector 30 transmits that alarm status to utility server 80. Upon receiving the alarm, the gas utility company can then respond by dispatching service technicians to shut off the electric and gas service and notify local fire departments, etc. Smart methane detector 30 may also be programmed to contact the customer calls in an alarm condition, such as by telephone calls to POTS lines, cell phones, SMS text messaging, email, Twitter™, Facebook™, MySpace™, or a Smartphone™ application.

FIG. 1 illustrates a first method for back-up communications using a POTS modem 90 should the broadband internet connection 71, gateway 60, or network 12 fail. In the event of an alarm condition, coordinator 20 establishes a dial-up connection 22 directly with utility company server 80. Preferably server 80 includes a number of POTS modems and incoming dial-up lines for supporting a number of emergency dial-up calls at a time. Modem 90 may be internal to or external from coordinator 20.

FIG. 2 illustrates a second method for back-up communications using a POTS modem 90 should the broadband internet connection 71 fail. Gateway 60 is configured to automatically establish a dial-up connection 72 to an internet service provider using modem 90 whenever it detects a failure of broadband connection 71. In this manner, the back-up internet connection is transparent to the ZigBee coordinator 40 and wireless network 11. Modem 90 may be internal to or external from gateway 60.

Figure 4:
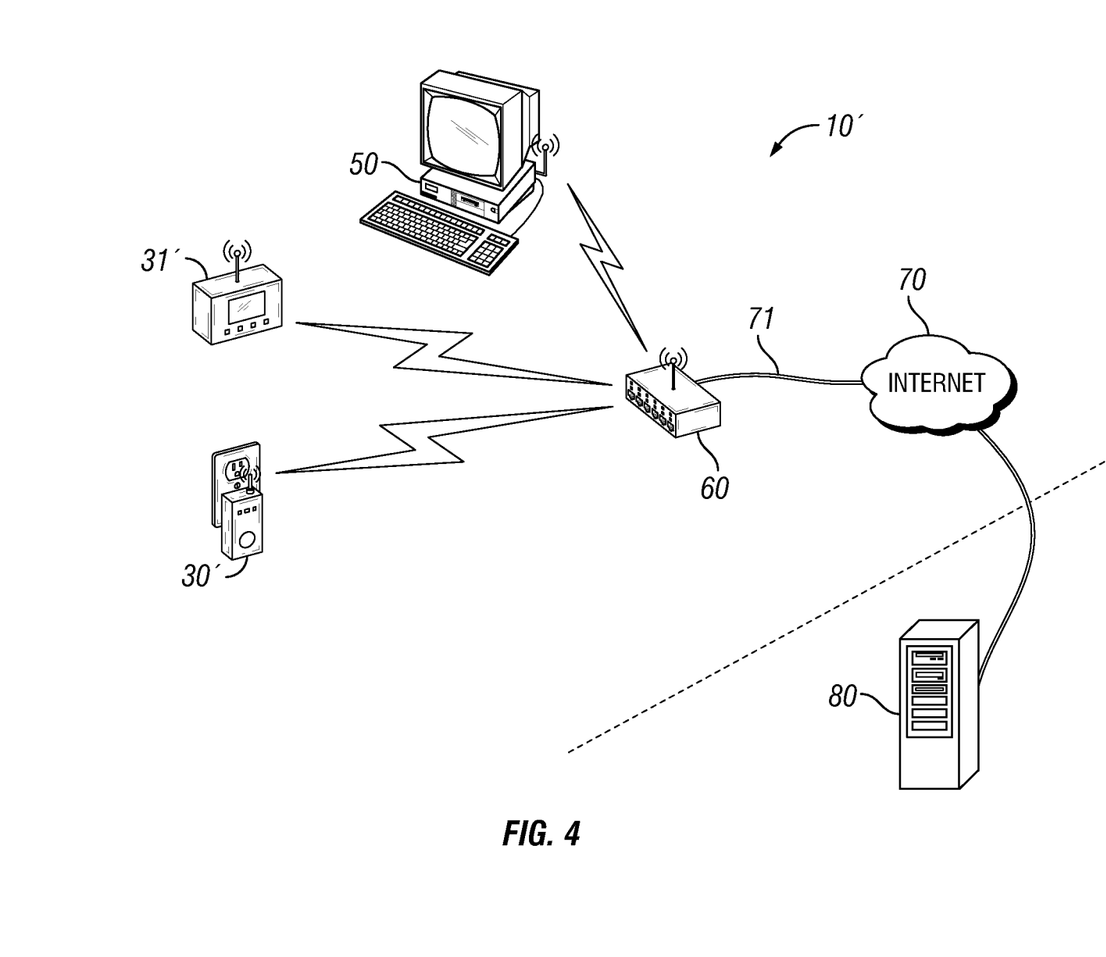
FIG. 4 is a functional schematic diagram of a smart methane monitoring system according to a third embodiment of the invention showing a methane detector included as a device within a local area computer network for communicating with a gas utility company via the internet.

Although the preferred embodiment of the invention is described as employing a ZigBee-compliant wireless network 12, WiFi, Bluetooth or other types of wireless networks 12 may also be used between methane detector 30 and internet 70 as appropriate. For example, FIG. 4 illustrates an alternate embodiment of a smart energy network 10' in which methane detector 30' and display 31' communicate using an IEEE 802.11 wireless WiFi standard. As such, methane detector 30' and display 31' are linked directly with gateway/router 60.

Figure 5:
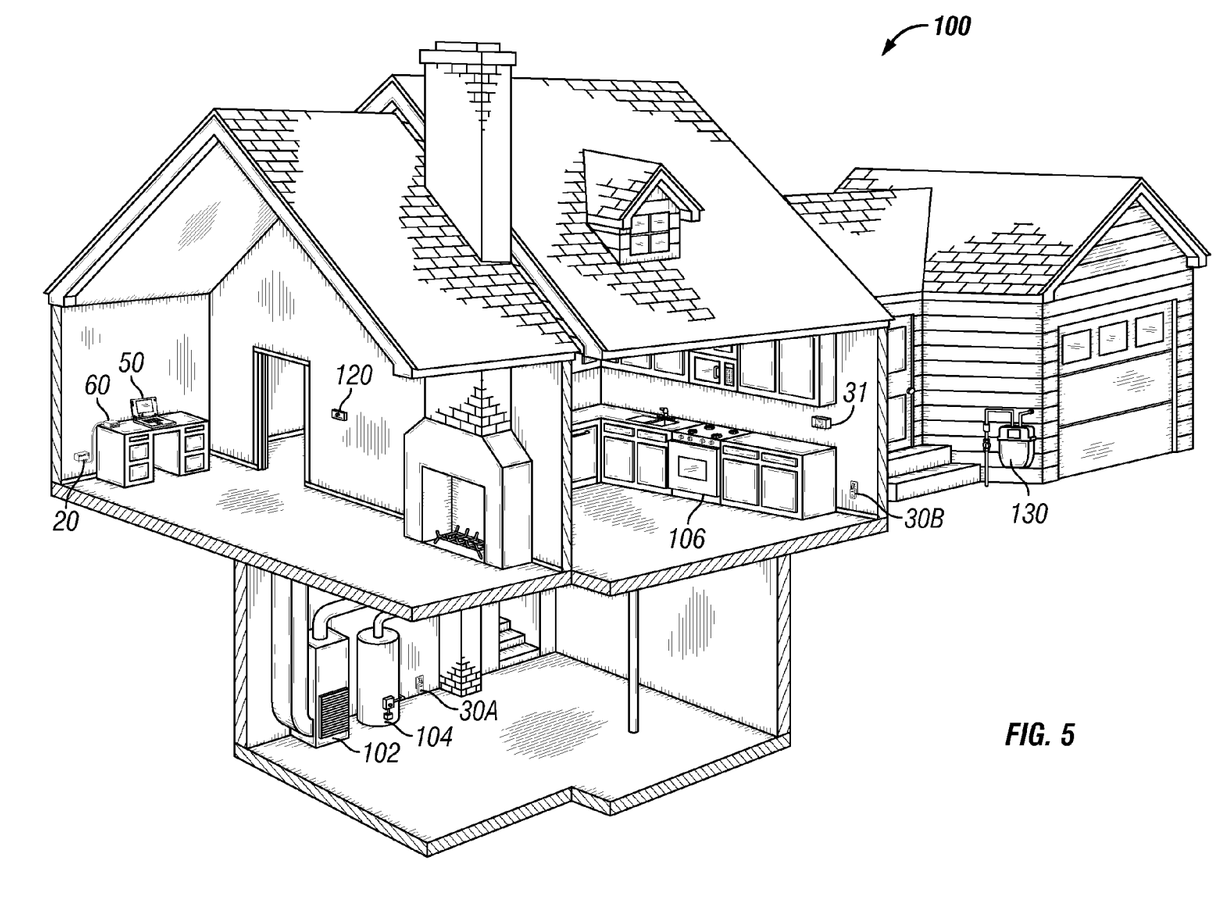
FIG. 5 is a perspective view in partial cross-section of a smart home of a subscriber to a natural gas provider according to a preferred embodiment of the invention showing a smart energy home area network implemented according to the embodiment of FIG. 2, including a smart energy-enabled gas meter, a status indicator, and a smart methane detector.

FIG. 5 depicts how the smart energy network 10 of FIG. 2 might be implemented within a typical house 100. Smart methane detectors 30 are located near gas appliances. For example, a first methane detector 30A (or a carbon monoxide detector, for example) is located in the basement adjacent to a gas furnace 102 and water heater 104, and a second methane detector 30B is located in the kitchen near a gas range 106. Additional methane detectors and/or carbon monoxide detectors (not shown) may be located in a laundry room, utility room, attic, or garage, for example. Coordinator 20, computer 50 and gateway/router 60 are located in a home office, although a bedroom, library, study, conservatory, home theatre or any other convenient location may be used, provided coordinator 20 is located within wireless range of all of the smart energy end devices. Display unit 31 is placed in a prominent location in the kitchen, although it or additional display units may be located near a thermostat 120, an alarm panel, intercom station, or other annunciator device. A smart energy enabled thermostat 120 and smart energy gas meter 130 are shown.

Figure 6:
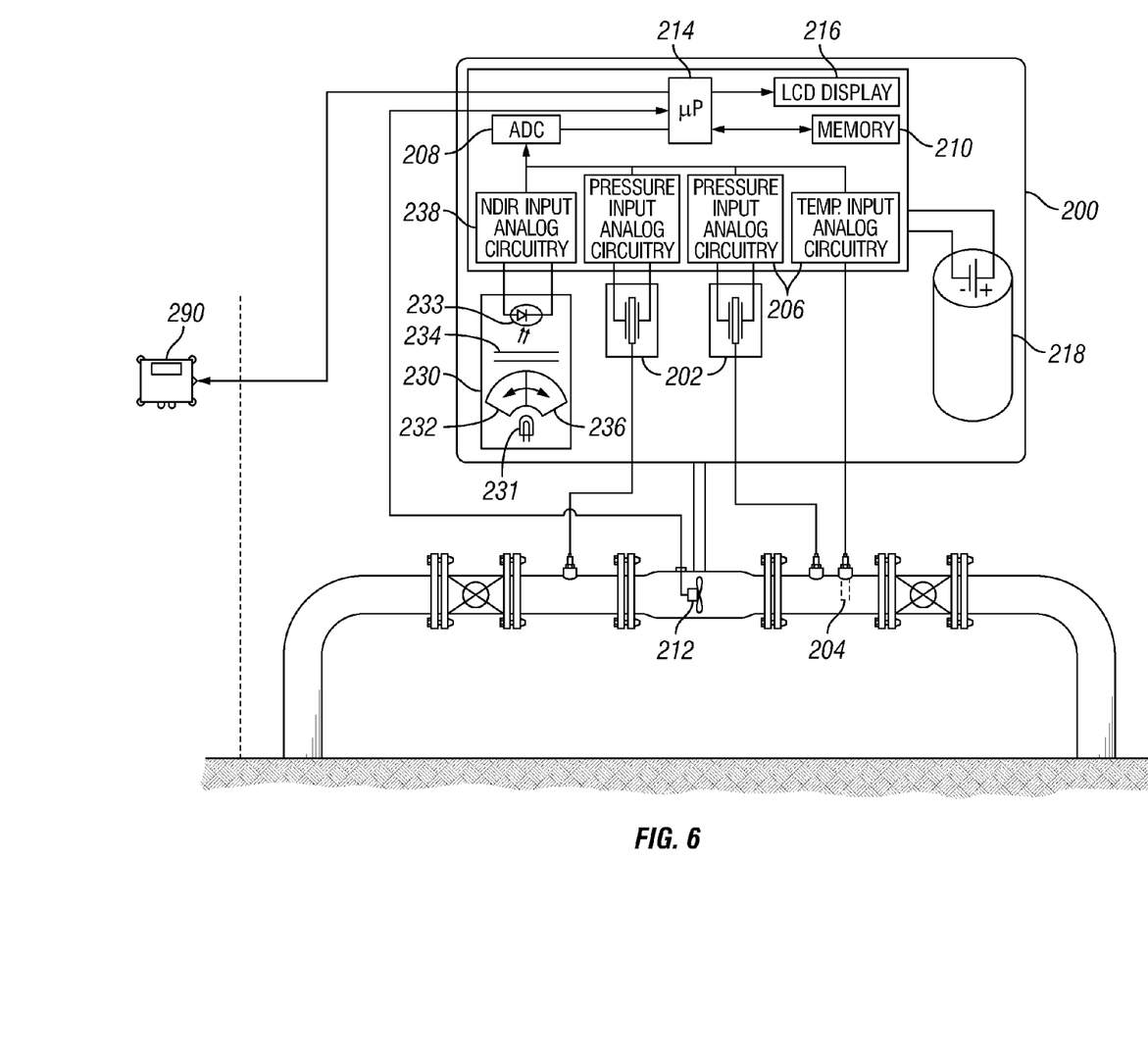
FIG. 6 is a schematic diagram of a remote volume corrector or an electronic data recorder integrated with a methane detector according to a fourth embodiment of the invention.

FIG. 6 illustrates a methane detector system according to another embodiment of the invention in which a low power methane detector 230 is integrated into a flow corrector or electronic data recorder 200 for use in metering stations, step-down stations and similar remote locations within a natural gas distribution system. Volume corrector or electronic data recorder 200 includes one or more pressure transducers 202 and a temperature probe 204, the signals from which are conditioned by analog circuitry 206, sampled by an analog-to-digital converter (ADC) 208, and stored as digital data in memory 210. Digital pulses from a gas meter 212 are also collected. A microcontroller or microprocessor 214 coordinates the collection and transmission of data and may perform volume correction calculations. A POTS modem 290 is connected to volume corrector or electronic data recorder 200 for interfacing the device to the SCADA system of a gas utility company, although other data transmission methods may be used including a broadband internet gateway, frame relay service, cellular telephone, text, or G3 internet service, or other radio communication. Volume corrector or data recorder 200 typically includes a display 216 and a battery 218.

Like methane detector 30, 30' of FIGS. 1-5, methane detector 230 is preferably an IR OMD such as an NDIR detector. Detector 230 includes an IR light source 231 (which may be a laser or LED), a sample chamber 232, and an IR detector 233. In the case of a non-monochromatic light source 231, detector 230 also includes one or more optical filters 234. An optional calibration cell 236 may be included, which may be selectively positioned into the detection optical path in place of sample chamber 232. Detector 230 interfaces to ADC 208 via analog signal conditioning circuitry 238. Processor 214 is programmed to record methane levels, to transmit high-methane-level alarms to the gas utility company, and to control which gas cell—sample chamber 232 or calibration cell 236—is positioned in the measurement optical light path. Detector 230 may also include a carbon monoxide detector as discussed above with respect to methane detector 30.

The Abstract of the disclosure is written solely for providing the United States Patent and Trademark Office and the public at large with a way by which to determine quickly from a cursory reading the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

What is claimed is:

1. A natural gas distribution system comprising gas utility apparatus of a gas utility company which supplies natural gas to a plurality of consumer locations via a natural gas distribution system, said apparatus including a service computer system (80) which is connected to the internet (70), a plurality of methane detectors (30) disposed so that each of said plurality of consumer locations has at least one of said plurality of methane detectors, each of said plurality of methane detectors having a low-power, low-bandwidth radio transceiver, an infrared light source (231), an infrared light detector (233) disposed so as to receive light from said infrared light source, and a sampling chamber (232) disposed between said infrared light source and said infrared light detector, smart energy communication networks (10) that link each of said plurality of methane detectors (30) with said internet (70) for communication with said service computer system (80) of said gas utility company, said smart energy communication networks (10) each including a network coordinator (20) in communication with said internet (70) for communication with said service computer system (80) of said gas utility company, said plurality of network coordinators (20) placed at one of said consumer locations so that each of said plurality of methane detectors (30) is in wireless communication with at least one of said plurality of network coordinator (20), circuitry disposed in each of said methane detectors (30) which is arranged and designed to notify said service computer system (80) of said gas utility company of high methane gas conditions via said smart energy communication network (10), and a display device (31) disposed in one of said consumer locations, said device (31) being in wireless communication with one of said plurality of network coordinators (20) via said smart energy wireless network (11), said display device designed for displaying said methane gas conditions detected by said at least one of said plurality of methane detectors.

2. The system of claim 1 wherein:

said plurality of consumer locations includes residential homes; and each of said residential homes includes one of said plurality of network coordinators (20) to define a wireless home area network.

3. The system of claim 1 further comprising:

an infrared carbon monoxide detector disposed in one of said plurality of consumer locations in wireless communication with said at least one of said plurality of network coordinators via said smart energy wireless network (11); whereby said service computer system (80) is notified of a detected high concentration of carbon monoxide at one of said plurality of consumer locations.

4. The system of claim 1 further comprising:

a fire detector disposed in one of said plurality of consumer locations in wireless communication with said at least one of said plurality of network coordinators via said smart energy wireless network (11); whereby said service computer system (80) is notified of a detected fire at one of said plurality of consumer locations.

5. The system of claim 1 wherein:

said circuitry of at least one of said plurality of methane detectors is further arranged to notify a consumer of said gas utility company of an alarm condition by at least one mode from the group consisting of telephone, text message, email, instant message, web page, and smart phone application.

* * * * *